(12) United States Patent
Yoneda

(10) Patent No.: US 8,106,149 B2
(45) Date of Patent: Jan. 31, 2012

(54) AMINO GROUP-CONTAINING WATER-SOLUBLE COPOLYMER

(75) Inventor: Atsuro Yoneda, Toyonaka (JP)

(73) Assignee: Nippon Shokubai Co., Ltd., Osaka-Shi, Osaka (JP)

( * ) Notice: Subject to any disclaimer, the term of this patent is extended or adjusted under 35 U.S.C. 154(b) by 322 days.

(21) Appl. No.: 11/721,768

(22) PCT Filed: Dec. 13, 2005

(86) PCT No.: PCT/JP2005/023211
§ 371 (c)(1),
(2), (4) Date: Jan. 28, 2008

(87) PCT Pub. No.: WO2006/064940
PCT Pub. Date: Jun. 22, 2006

(65) Prior Publication Data
US 2008/0262192 A1    Oct. 23, 2008

(30) Foreign Application Priority Data
Dec. 14, 2004    (JP) ................................. 2004-360883

(51) Int. Cl.
*C08G 63/685* (2006.01)
(52) U.S. Cl. .................... 528/332; 528/391; 528/422
(58) Field of Classification Search .......... 528/332, 528/422, 391, 42
See application file for complete search history.

(56) References Cited

U.S. PATENT DOCUMENTS
5,270,379 A * 12/1993 McAndrew et al. .......... 524/555

FOREIGN PATENT DOCUMENTS

| | | | |
|---|---|---|---|
| JP | 5-287685 A | 11/1993 | |
| JP | 5-287690 A | 11/1993 | |
| JP | 5-302289 A | 11/1993 | |
| JP | 5-311194 A | 11/1993 | |
| JP | 5287690 | 11/1993 | |
| JP | 5311194 | 11/1993 | |
| JP | 7-070534 A | 3/1995 | |
| JP | 7070534 | 3/1995 | |
| JP | 10-036440 A | 2/1998 | |
| JP | 10-036441 A | 2/1998 | |
| JP | 10036440 | 2/1998 | |
| JP | 10036441 | 2/1998 | |
| JP | 2002-265525 A | 9/2002 | |
| JP | 2002265525 | 9/2002 | |
| JP | 2003-034704 A | 2/2003 | |
| JP | 2003034704 | 2/2003 | |
| JP | 2003-192722 A | 7/2003 | |
| JP | 2003192722 | 7/2003 | |
| JP | 2005-104999 A | 4/2005 | |
| JP | 2005104999 | 4/2005 | |

OTHER PUBLICATIONS

Office Action issued in related Japanese Application No. 2006-527214 on Sep. 13, 2011.

* cited by examiner

*Primary Examiner* — James J Seidleck
*Assistant Examiner* — Gregory Listvoyb
(74) *Attorney, Agent, or Firm* — Connolly Bove Lodge & Hutz LLP

(57) ABSTRACT

To provide an amino group-containing water-soluble copolymer having a high chelating performance and clay dispersancy and a method of producing the amino-group containing water-soluble copolymer efficiently and with high productivity. A water-soluble polymer containing an amino group-containing monomer unit, wherein the water-soluble polymer has a molecular weight distribution of 12 or less, and a method of producing the water-soluble polymer according to any one of claims 1 to 4, wherein the method comprises a step of polymerizing an amino group-containing allyl monomer using an initiator containing a heavy metal ion and sulfurous acid (sulfite), hydrogensulfite or hydrogen peroxide.

26 Claims, No Drawings

AMINO GROUP-CONTAINING WATER-SOLUBLE COPOLYMER

CROSS-REFERENCE TO RELATED APPLICATIONS

This application is the National Stage of International Application No. PCT/JP2005/023211 filed on Dec. 13, 2005, which claims priority to Application No. 2004-360883 filed in Japan on Dec. 14, 2004 under 35 U.S.C. §119; the entire contents of all are hereby incorporated by reference.

TECHNICAL FIELD

The present invention relates to a water-soluble copolymer having an amino group, and more specifically relates to: a water-soluble copolymer which is suitable for a builder for liquid or powder detergent, a water-treatment agent, a fiber-treatment agent and other dispersants and exerts a high detergency if it is used together with a surfactant, for example, as a builder for detergent; and a method of producing the copolymer and an application thereof.

BACKGROUND ART

An amino-group containing water-soluble copolymer can act as, for example, a polymer builder due to properties derived from an amino group, a group exhibiting water solubility and the like. A detergent containing such a copolymer is needed to have a detergency derived from a clay dispersancy and the like and a stabilization ability to a bleaching agent. And if the copolymer is used as a component composing a liquid detergent, it is needed to have a property of dissolution in a liquid detergent. In another technical field where the water-soluble copolymer is used, for example, fields of a water-treatment agent, a fiber-treatment agent and other dispersants, the copolymer is needed to have improved fundamental properties such as a treatment ability.

As a conventional polymer having an amino group, disclosed is a builder for detergent and a detergent composition containing the builder, for example, in Japanese Kokai Publication Hei-05-311194.

And as for applications of the amino group-containing water-soluble copolymer to bleaching, dying and the like, disclosed are, for example, a bleaching agent composition and a method for bleaching in Japanese Kokai Publication Hei-05-302289, a method for bleaching of wood pulp in Japanese Kokai Publication Hei-05-302288, a method of dying cellulosic fiber in Japanese Kokai Publication Hei-05-287685, and a method of stick prevention in a digester in a kraft pulp production process in Japanese Kokai Publication Hei-05-287690. These detergent compositions and polymers capable of being used for bleaching, dying and the like are produced by polymerizing an imino group-containing compound and allyl glycidyl ether. And the compositions and polymers have a functional group such as a hydroxyl group on a side chain and an amino group at an end of the side chain. However, the molecular weight distribution of such polymers is relatively wide and is not controlled so as to fall within a specified range.

However, in these polymers, there was a room for contrivance to make it possible to more suitably apply these polymers to applications such as a builder for cleaning, a water-treatment agent and a fiber-treatment agent, for example, by improving a detergency and a stabilization ability to a bleaching agent in order to more effectively exert properties of the amino-group containing water-soluble copolymer, that is, properties derived from the amino group, the group and the like exhibiting water solubility.

SUMMARY OF THE INVENTION

In view of the above state of the art, it is an object of the present invention to provide an amino group-containing water-soluble copolymer having a high chelating performance and clay dispersancy and a method of producing the amino-group containing water-soluble copolymer efficiently and with high productivity.

The present inventors made various investigations concerning amino group-containing water-soluble copolymers, and consequently found that an amino group-containing water-soluble copolymer having a molecular weight distribution (weight-average molecular weight Mw/number-average molecular weight Mn) of a specified value or lower has an improved chelating performance and clay dispersancy and whereby trapping of metal components and detergency were improved, although amino group-containing water-soluble copolymers having a large molecular weight and a wide molecular weight distribution and a low polymer purity had been previously disclosed. And, they also found that with respect to a method of producing the amino-group containing water-soluble copolymer, if the amino group-containing allyl monomer is polymerized using a specific initiator, a polymer, which has not only a molecular weight distribution of a specified value or lower, but also a high polymerization of 40% or more of final solid content and a total concentration of remaining monomers contained of 15000 ppm or less, could be produced, and thereby they admirably solved the above-mentioned problems. Furthermore, they found that the amino group-containing water-soluble copolymer could be suitably applied to various applications such as a builder for cleaning, a water-treatment agent and a fiber-treatment agent. These findings have now led to completion of the present invention.

That is, the present invention relates to a water-soluble polymer containing an amino group-containing monomer unit, wherein the water-soluble polymer has a molecular weight distribution of 12 or less.

The present invention also relates to a method of producing the water-soluble polymer, wherein the method comprises a step of polymerizing an amino group-containing allyl monomer using an initiator containing a heavy metal ion and sulfurous acid (sulfite), hydrogensulfite or hydrogen peroxide.

DISCLOSURE OF THE INVENTION

Hereinafter, the present invention will be described in detail.

The water-soluble polymer of the present invention has a molecular weight distribution of 12 or less. If the polymer has a molecular weight distribution within such a range, the polymer is excellent in clay dispersancy and stabilization ability to a bleaching agent, as compared with conventional water-soluble polymers. If the polymer has a molecular weight distribution of more than 12, the polymer has an insufficient detergency and stabilization ability to a bleaching agent and can not exhibit excellent performance in applications such as a builder for cleaning, a water-treatment agent and a fiber-treatment agent. The molecular weight distribution is preferably 12 or less and more preferably 9 or less. The molecular weight distribution preferably has a range of 4 to 12, more preferably 4 to 9 and furthermore preferably 4 to 6.

The molecular weight distribution in the present invention is a ratio of the weight-average molecular weight (Mw) to the number-average molecular weight (Mn) and represented by Mw/Mn.

The weight-average molecular weight and the number-average molecular weight of the above water-soluble polymer may be appropriately determined depending on the molecular weight distribution and is not particularly limited.

The above weight-average molecular weight is preferably, for example, 1000 to 100000. If the weight-average molecular weight is less than 1000, the dispersion performance of the water-soluble polymer may be deteriorated. If it is more than 100000, the dispersion performance of the water-soluble polymer is deteriorated, which may lower the solubility when the polymer is used for a liquid detergent.

The above weight-average molecular weight more preferably has a lower limit of 5000 or more, furthermore preferably 8000 or more and particularly preferably 10000 or more. The upper limit is more preferably 60000 or less, furthermore preferably 40000 or less and particularly preferably 20000 or less.

The above number-average molecular weight of the water-soluble polymer is preferably 500 to 6000, more preferably 1000 to 5000, and furthermore preferably 2000 to 4000.

Both of the above weight-average molecular weight (Mw) and the above number-average molecular weight (Mn) of the water-soluble polymer are values determined by GPC (gel permeation chromatography). Measuring conditions and apparatus and the like are exemplified as follows.
(1) column for GPC; GF-7 MHQ (trade name) manufactured by SHOWA DENKO K.K. is given.
(2) Mobile phase; Pure water is added to 34.5 g of disodium hydrogenphosphate 12-hydrate and 46.2 g of sodium dihydrogen phosphate dihydrate (both are special grade chemicals) in a concentration drier to form 5000 g of an aqueous solution and then this aqueous solution is used as a mobile phase after being filtered with a membrane filter of 0.45 μm.
(3) Detector; Model 481 manufactured by Nihon Waters K.K. is used at a UV detection wavelength of 214 nm.
(4) Pump; L-7110 (trade name) manufactured by Hitachi, Ltd. is used.
(5) Flow rate of mobile phase; 0.5 ml/minute and a temperature of 35° C.

A calibration curve is prepared using a standard sample of polysodium acrylate produced by Sowa Science Corporation.

It is preferable the water-soluble polymer contains an amino group-containing monomer unit, wherein the amino group-containing monomer unit is preferably represented by the following formula (1);

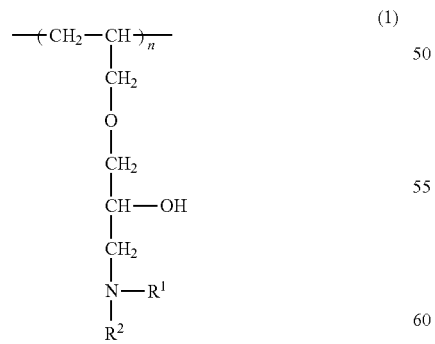

(1)

in the formula, $R^1$ and $R^2$ are the same or different from each other and each represent a hydrogen atom or an organic group. And the amino group in the above formula (1) may be a quaternary amino group. The organic group represents straight chain, branched or cyclic hydrocarbon having 1 to 30-carbon atoms. This hydrocarbon preferably has 1 to 20 carbon atoms and more preferably 1 to 12 carbon atoms.

The present invention of a water-soluble polymer may suitably comprise, consist essentially of an amino group-containing monomer unit.

It is preferable that in the amino group-containing monomer unit, the $R^1$ and $R^2$ in the formula (1) are the same or different from each other and each represent a group selected from the group consisting of
(I) a hydrogen atom,
(II) an organic group having a carboxylic acid group or a group in a form of salt thereof,
(III) an organic group having a sulfonic acid group or a group in a form of salt thereof,
(IV) an organic group having a hydroxyl group, and
(V) an organic group having an amino group.

Preferred form of the $R^1$ and $R^2$ in the above formula (1) is a form in which both of the $R^1$ and $R^2$ are organic groups. However, a form in which the $R^1$ and $R^2$ are simultaneously hydrogen atoms is preferable, and a form in which any one of the $R^1$ and $R^2$ is a hydrogen atom and the other one has another group is also preferable.

The carboxylic acid group in the (II) or the sulfonic acid group in the (III) may have a form of salt represented by $-COOM^1$ or $-SO_3M^1$, and $M^1$ is preferably an alkali metal atom, an alkaline-earth metal atom, ammonium, organic amine and the like.

Preferred examples of the above alkali metal atom include sodium, lithium, potassium, rubidium and cesium. Preferred examples of the above alkaline-earth metal atom include magnesium, calcium, strontium and barium. Preferred examples of the above organic amine include alkylamines such as monoethylamine, diethylamine and triethylamine; alkanolamines such as monoethanol amine, diethanolamine and triethanolamine; and polyamines such as ethylenediamine and triethylenediamine.

The organic groups in the (II) to (V) are preferably straight chain, branched or cyclic hydrocarbons having 1 to 12 carbon atoms. Specific examples of such an organic group include a methyl group, an ethyl group, a propyl group, a butyl group, a phenyl group and a benzyl group.

It is preferred that the $R^1$ and $R^2$ in the amino group-containing monomer unit are the same or different from each other and each represent a group selected from the group consisting of the following formulas (2) to (10);

(2)

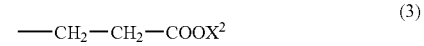

(3)

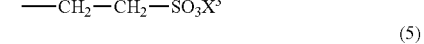

(4)

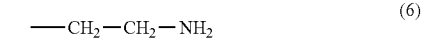

(5)

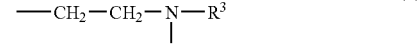

(6)

(7)

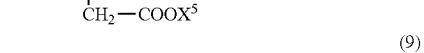

(8)

(9)

$$—CH—COOX^8 \atop \underset{OH}{CH—COOX^9} \qquad (10)$$

in the formula, $X^1$ to $X^9$ are independent of each other and each represent a hydrogen atom, an alkali metal, an alkaline-earth metal, an ammonium group or an organic amine group, and $R^3$ and $R^4$ are the same as the $R^1$ and $R^2$, respectively, or each represent an alkyl group or an aryl group having 1 to 12 carbon atoms.

When the above $X^1$ to $X^9$ are an alkali metal, an alkaline-earth metal, an ammonium group or an organic amine group, the above formulas (2) to (10) each represent a salt. The amino group in the above formula (7) may be a quaternary amino group.

The present invention also relates to a method of producing the water-soluble polymer, wherein the method comprises a step of polymerizing an amino group-containing allyl monomer using an initiator containing a heavy metal ion and sulfurous acid (sulfite), hydrogensulfite or hydrogen peroxide.

By using the above initiator, the molecular weight distribution of a water-soluble polymer produced by a polymerization reaction can be 12 or less, and the water-soluble polymer is excellent in clay dispersancy and chelating performance. Furthermore, a method of producing the water-soluble polymer in the present invention is preferably the above-mentioned method, but it is not particularly limited as long as it is a method for producing the above water-soluble polymer having a molecular weight distribution of 12 or less, and it may be another method.

The above water-soluble polymer preferably contains the above amino group-containing monomer unit represented by the above formula (1), and preferably produced by, for example, polymerizing a monomer equivalent to the above amino group-containing monomer unit. This polymerization can be performed by a method, such as solution polymerization and bulk polymerization and the method is not particularly limited.

As the monomer equivalent to the above amino group-containing monomer unit, there are given, for example, an amino group-containing allyl monomer represented by the following formula (11);

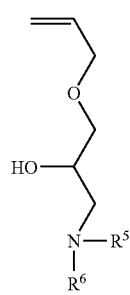

(11)

in the formula, $R^5$ and $R^6$ are the same as the $R^1$ and $R^2$ of the above formula (1), respectively, or each represent an alkyl group or aryl group having 1 to 12 carbon atoms.

Preferable examples of the $R^5$ and $R^6$ in the amino group-containing allyl monomer are the same as those in the $R^1$ and $R^2$ in the amino group-containing monomer unit, which is an essential component of the water-soluble polymer described above.

The above amino group-containing allyl monomer can be appropriately selected depending on the water-soluble polymer producing the $R^5$ and $R^6$. Among others, particularly preferred is an amino group-containing allyl monomer produced by adding an amine compound such as iminodiacetic acid (IDA) to allyl glycidyl ether (AGE), which is represented by the following formula (12);

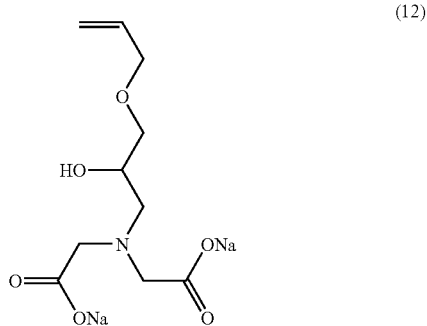

(12)

The monomer constituting the water-soluble polymer of the present invention may include other monomers. Preferable example of the monomers include unsaturated carboxylic acid monomers such as unsaturated monocarboxylic acid monomers and unsaturated dicarboxylic acid monomers; styrenic monomers such as styrene, bromostyrene, chlorostyrene, methylstyrene and vinyl toluene; hydroxyl group-containing unsaturated hydrocarbons such as vinyl alcohol, 3-methyl-2-butene-1-ol and 3-methyl-3-butene-1-ol; and nitrogen atom-containing unsaturated monomers such as vinylpyrrolidone. These monomers may be used singly or in combination of two or more of them. It is preferred that the other monomers are at least one species selected from the group consisting of unsaturated carboxylic acid monomers, styrenic monomers, hydroxyl group-containing unsaturated hydrocarbons and nitrogen atom-containing unsaturated monomers. And the other monomers more preferably contain the unsaturated carboxylic acid monomers, and furthermore preferably the unsaturated monocarboxylic acid monomers, and most preferably (meth)acrylic acid.

A copolymer produced by copolymerizing a monomer component containing the amino group-containing allyl monomer and the unsaturated carboxylic acid monomer is referred to as a polycarboxylic acid copolymer.

The above unsaturated carboxylic acid monomer may be a monomer having a polymerizable unsaturated group and a carboxyl group, and an unsaturated monocarboxylic acid monomer, an unsaturated dicarboxylic acid monomer and the like are suitable.

The above unsaturated monocarboxylic acid monomer may be a monomer having an unsaturated group and a carboxyl group in a molecule, and a preferable form of this monomer is a compound represented by the following formula (13);

(13)

in the above formula (13), $R^7$ represents a hydrogen atom or a methyl group. $M^2$ represents a hydrogen atom, a metal atom, ammonia or organic amine.

Preferred examples of the metal atom in $M^2$ of the above formula (13) include monovalent metal atoms of alkali metals such as lithium, sodium and potassium; divalent metal atoms of alkaline-earth metals such as calcium and magnesium; and trivalent metal atoms such as aluminum and iron. Preferred examples of the organic amine include alkanolamines such as ethanol amine, diethanolamine and triethanol amine, and triethylamine, and furthermore may be ammonium. Preferred example of such an unsaturated monocarboxylic acid monomer include acrylic acid, methacrylic acid, crotonic acid and the like; monovalent metal salts thereof, divalent metal salts thereof, ammonium salts thereof, organic amine salts thereof and the like. Among others, (meth)acrylic acid, monovalent metal salt thereof, divalent metal salt thereof, ammonium salt thereof, organic amine salt thereof and the like are preferably used and suitable as the unsaturated carboxylic monomer in view of improving dispersion ability if the water-soluble polymer containing the unsaturated monocarboxylic acid monomer is used as a builder for detergent.

The above unsaturated dicarboxylic acid monomer may be a monomer having an unsaturated group and two carboxyl groups in a molecule, and suitable are maleic acid, itaconic acid, citraconic acid and fumaric acid, and monovalent metal salts thereof, divalent metal salts thereof, ammonium salts thereof, organic ammonium salts thereof (organic amine salts thereof) and the like, or anhydrides thereof.

Preferred examples of the above unsaturated carboxylic acid monomer other than the above monomers include half-ester of an unsaturated dicarboxylic acid monomer and an alcohol having 1 to 22 carbon atoms, half-amide of an unsaturated dicarboxylic acid and an amine having 1 to 22 carbon atoms, half-ester of an unsaturated dicarboxylic acid monomer and a glycol having 2 to 4 carbon atoms, half-amide of maleamidic acid and a glycol having 2 to 4 carbon atoms.

As the water-soluble polymer in the present invention, suitably used is a copolymer of (meth)acrylic acid (methacrylate) and an amino group-containing allyl monomer produced by adding an amine compound such as iminodiacetic acid (IDA) to allyl glycidyl ether (AGE).

As the above other monomers, used may be the following compounds: dienes such as 1,3-butadiene, isoprene, isobutylene; (meth)acrylate esters such as methyl(meth)acrylate, ethyl (meth)acrylate, butyl(meth)acrylate, pentyl(meth)acrylate, hexyl(meth)acrylate, decyl(meth)acrylate, lauryl (meth)acrylate; α-olefins such as hexene, heptene, decene, etc.; alkyl vinyl ethers such as methyl vinyl ether, ethyl vinyl ether, butyl vinyl ether; vinyl esters such as vinyl acetate; and allyl esters such as allyl acetate;

diesters of the above unsaturated dicarboxylic acid monomer and the alcohol having 1 to 22 carbon atoms, diamides of the above unsaturated dicarboxylic acid and the amine having 1 to 22 carbon atoms, and diesters of the above unsaturated dicarboxylic acid monomer and the glycol having 2 to 4 carbon atoms;

difunctional (meth)acrylates such as hexanediol di(meth)acrylate, trimethylolpropane tri(meth)acrylate and trimethylolpropane di(meth)acrylate; unsaturated sulfonic acids such as vinylsulfonate, (meth)allyl sulfonate, 2-(meth)acryloxyethyl sulfonate, 3-(meth)acryloxypropyl sulfonate, 3-(meth)acryloxy-2-hydroxypropyl sulfonate, 3-(meth)acryloxy-2-hydroxypropyl sulfophenyl ether, 3-(meth)acryloxy-2-hydroxypropyl oxysulfo benzoate, 4-(meth)acryloxybutyl sulfonate, (meth)acrylamidomethyl sulfonic acid, (meth)acrylamidoethyl sulfonic acid, (meth)acrylamido-2-methyl propane sulfonic acid and styrenesulfonic acid, and monovalent metal salts thereof, divalent metal salts thereof, ammonium salts thereof and organic ammonium salts thereof (organic amine salts thereof);

unsaturated amides such as (meth)acrylamide, (meth)acrylalkylamide, N-methylol(meth)acrylamide and N,N-dimethyl(meth)acrylamide; allyls such as allyl alcohol; unsaturated amino compounds such as dimethylaminoethyl (meth)acrylate; and vinyl ethers or allyl ethers such as methoxypolyethyleneglycolmonovinyl ether, polyethyleneglycol monovinyl ether, methoxypolyethyleneglycol mono(meth)allyl ether and polyethyleneglycol mono(meth)allyl ether;

(meth)acrylate compounds such as hydroxyethyl(meth)acrylate, hydroxypropyl(meth)acrylate, methoxyethyl(meth)acrylate, ethoxyethyl(meth)acrylate, butoxyethylethyl(meth)acrylate and methoxypropyl(meth)acrylate.

As for the composition ratio of the respective monomers forming the water-soluble polymer of the present invention, the ratio of the amino group-containing allyl monomer is preferably 1 to 50 mole % and the ratio of the other monomers is preferably 50 to 1 mole % based on the total monomers. If the weight ratios of these monomers are out of the above range, functional effects of the present invention may be insufficiently exhibited because of decrease in the amount of the amino group or decrease in the molecular weight. More preferably, the ratio of the amino group-containing allyl monomer is 5 to 40 mole % and the ratio of the other monomers is 95 to 60 mole %.

If the ratio of the above other monomers is too large, gelation and a crosslinking reaction may occur in preparing the copolymer to decrease the water solubility of the copolymer. The decrease in the water solubility can be prevented by controlling an amount of the unsaturated compounds used in preparing the amino group-containing allyl monomer to reduce the number of repeating units formed by the other monomers per one molecule of the copolymer or by controlling an amount of the other monomers to decrease a polymerization degree of the repeating units.

If the above water-soluble polymer contains a component containing the unsaturated carboxylic acid monomers, with respect to the composition ratio of the respective monomers forming the polymer (polycarboxylic acid copolymer), the ratio of the amino group-containing allyl monomer is preferably 1 to 50 mole % and the ratio of the unsaturated carboxylic acid monomer is preferably 50 to 99 mole % based on the total monomers. Furthermore, the above water-soluble polymer may contain the above other monomers copolymerizable with these monomers. The ratio of the amino group-containing allyl monomer is more preferably 5 to 40 mole % and furthermore preferably 10 to 30 mole %. The ratio of the unsaturated carboxylic acid monomer is more preferably 95 to 60 mole % and furthermore preferably 90 to 70 mole %. Furthermore, as the unsaturated carboxylic acid monomer, (meth)acrylic acid (methacrylate) is particularly preferred as mentioned above.

The above initiator in the production method preferably contains a heavy metal ion and sulfurous acid (sulfite), hydrogensulfite or hydrogen peroxide as essential components.

The above initiator may be a substance prepared by a combination of the heavy metal ion as an essential component and sulfurous acid (sulfite), hydrogensulfite or hydrogen peroxide as one more essential component, and one or two or more species of the sulfurous acid (sulfite), hydrogensulfite or hydrogen peroxide may be contained. Preferred examples of the combination include a combination of the heavy metal ion and the sulfurous acid (sulfite), the heavy metal ion and the hydrogensulfite, and the heavy metal ion and the hydrogen peroxide.

As the above (polymerization) initiator, a species or an addition amount thereof is not particularly limited as long as the initiator contains the above essential components and produces a polymer having a molecular weight distribution of a specified value or lower. And the following substances can be suitably used.

The heavy metal ion essentially contained in the above initiator means a metal having a specific gravity of 4 g/cm$^3$ or more. Preferred examples of the heavy metal ion include ions of metals such as iron, cobalt, manganese, chromium, molybdenum, tungsten, copper, silver, gold, lead, platinum, iridium, osmium, palladium, rhodium and ruthenium. One or more species of these heavy metals may be used. Among others, iron is more preferred.

The ionic valency of the above heavy metal ion is not particularly limited and for example, if iron is used as the heavy metal, an iron ion in the initiator may be $Fe^{2+}$ or $Fe^{3+}$, or may be a combination of these two ions.

The above heavy metal ion is not particularly limited as long as it is contained in the initiator in the form of ion, because the heavy metal ion in such a form is excellent in handling if a method using a solution formed by dissolving a heavy metal compound is employed. The heavy metal compound used in the method may be a compound containing the heavy metal ions needs to be contained in the initiator and it can be determined in accordance with the initiator used.

If iron is used as the above heavy metal ion, preferably used are heavy metal compounds such as Mohr's salt ($Fe(NH_4)_2(SO_4)_2 \cdot 6H_2O$), ferrous sulfate heptahydrate, ferrous chloride and ferric chloride. If manganese is used as the heavy metal ion, manganese chloride may be suitably used. These heavy metal compounds are water-soluble compounds, and therefore they can be used in the form of aqueous solutions and excellent in handling. A solvent for a solution formed by dissolving the above heavy metal compounds is not limited to water as long as it does not interfere with a polymerization reaction and it dissolves the heavy metal compounds in producing the water-soluble polymer of the present invention.

The above heavy metal ion is preferably contained in a catalyst amount at the step of polymerization in the present invention. The catalyst amount herein used means not an amount taken in into a final objective as a catalyst but an amount acting as a catalyst. Specifically, the catalyst amount is 100 ppm or less, preferably 10 ppm or less, and more preferably 5 ppm or less.

The content of the above heavy metal ion is preferably 0.1 to 10 ppm based on the total weight of a polymerization reaction solution on completion of the polymerization reaction. If the content of the heavy metal ion is less than 0.1 ppm, an effect of the heavy metal ion may be insufficiently exerted. On the other hand, if the content of the heavy metal ion is more than 10 ppm, a produced polymer may have a deteriorated color tone. And high content of the heavy metal ion may cause soil of a builder for detergent if a produced polymer containing the heavy metal ion is used as the builder for detergent, and may cause increase in scale of the polymer added if the produced polymer is used as a scale inhibitor.

The above term "on completion of the polymerization reaction" means a point when the polymerization reaction is substantially completed in the polymerization reaction solution and a desired polymer is produced. For example, if a polymer polymerized in the polymerization reaction solution is neutralized with an alkali component, the content of the heavy metal ion is determined based on the total weight of the neutralized polymerization reaction solution. If two or more species of the heavy metal ions are contained, the total of the heavy metal ions may fall within the above range.

The above sulfurous acid (sulfite) means sulfurous acid or salt thereof and the form, in which sulfurous acid is salt, is preferable. If sulfurous acid is salt, salts of metal atoms, ammonium or organic ammonium are preferable.

Preferred examples of the above salt of the metal atom include salts of monovalent metal atoms of alkali metals such as lithium, sodium and potassium; salts of divalent metal atoms of alkaline-earth metals such as calcium and magnesium; and salts of trivalent metal atoms such as aluminum and iron. And preferred examples of the salt of the organic ammonium (organic amine) include salts of alkanolamines such as ethanol amine, diethanolamine and triethanol amine, and triethylamine. Furthermore, the above organic ammonium may be ammonium. Among others, sodium salt is preferred.

If the above hydrogensulfite is used in the form of salt, the above salts are suitable.

The use amount of the sulfurous acid (sulfite), hydrogensulfite or hydrogen peroxide is preferably 20 g or less based on 1 mol of the monomer, more preferably 15 g or less, and furthermore preferably 10 g or less.

The above initiator essentially contains a initiator containing the heavy metal ion and the sulfurous acid (sulfite), the hydrogensulfite or the hydrogen peroxide as essential components. And the initiator containing persulfuric acid (persulfate) in addition to the above components is also one of the preferable embodiments.

The above persulfuric acid (persulfate) means persulfuric acid or salt thereof and the form, in which persulfuric acid is salt, is preferable. If persulfuric acid is salt, the above salts of the metal atoms, ammonium or organic ammonium are preferable.

If the above persulfuric acid (persulfate) is also contained in the initiator, the use amount of it is preferably 10 g or less based on 1 mol of the monomer.

Preferred forms of the above initiator include: a form containing hydrogen peroxide ($H_2O_2$), sodium persulfate (NaPS), and Fe; a form containing hydrogen peroxide ($H_2O_2$) and Fe; a form containing sodium hydrogensulfite (SBS), sodium persulfate (NaPS) and Fe; and a form of SBS, oxygen and Fe. More preferred are the form containing hydrogen peroxide ($H_2O_2$), sodium persulfate (NaPS), and Fe, and the form containing hydrogen peroxide and Fe, the form containing sodium hydrogensulfite (SBS), sodium persulfate (NaPS), and Fe. Furthermore preferred is the form containing $H_2O_2$, NaPS and Fe.

As the above (polymerization) initiator, a well-known initiator may be used in combination with the above initiator. For example, preferably used are persulfates such as sodium persulfate, potassium persulfate and ammonium persulfate; bisulfites such as sodium bisulfite, potassium bisulfite and ammonium bisulfite; pyrosulfite; azo compounds such as 2,2'-azobis(2-amidinopropane)hydrochloride, 4,4'-azobis-4-cyanovaleric acid, azobis(isobutyronitrile) and 2,2'-azobis(4-methoxy-2,4-dimethylvaleronitrile); organic peroxides such as benzoyl peroxide, lauroyl peroxide, peracetic acid, di-tert-butylperoxide and cumene hydroperoxide. These polymerization initiators may be used singly or in combination of two or more of them in addition to the above initiator containing the heavy metal ion and the sulfurous acid (sulfite), hydrogen sulfite or hydrogen peroxide. In such a case, the ratio of the well known initiator to the initiator containing the heavy metal ion and the sulfurous acid (sulfite), hydrogensulfite or hydrogen peroxide is preferably 10 weight % (mass %) or less.

As the above well-known initiator, it is preferred to use one or more species of each the persulfates and the bisulfites. In this case, it is preferred to use 0.5 to 5 parts by weight of the bisulfites per 1 part by weight of the persulfates. More preferred is 1 or more parts by weight of the bisulfites. Furthermore preferred is 2 or more parts by weight of the bisulfites per 1 part by weight of the persulfates. And more preferred is 4 or less parts by weight of the bisulfites. Furthermore preferred is 3 or less parts by weight of the bisulfites per 1 part by weight of the persulfates. If the amount of the bisulfites is less than 0.5 parts by weigh per 1 part by weight of the persulfates, the total amount of the initiator may increase in reducing the molecular weight. If it is more than 5 parts by weigh per 1 part by weight of the persulfates, a side reaction may increase and whereby impurities may increase.

The use amount of the above initiator (the initiator including the above well known initiators, if necessary) is preferably 2 to 20 g based on 1 mol of the monomer. If the initiator having such a range is used, the amino group-containing water-soluble polymer can be efficiently produced and the molecular weight distribution of the water-soluble polymer can be reduced. The use amount is more preferably 4 to 18 g, and furthermore preferably 6 to 15 g.

In the above copolymerization method, a chain transfer agent may be used, if necessary. As such a chain transfer agent, one or two or more species of well-known chain transfer agents may be used.

As a method of adding the above initiator and chain transfer agent to a reaction vessel, a method of continuous charging, such as adding dropwise and charging dividedly may be used. The chain transfer agent may be introduced into the reaction vessel singly or may be previously mixed with the amino group-containing allyl monomer, the other monomers, a solvent or the like, which composes the monomer component.

In the above copolymerization method, the monomer component, the polymerization initiator or the like is preferably added to a reaction vessel by the following method: a method of performing a copolymerization by charging the total amount of the monomer components into the reaction vessel and then adding the polymerization initiator to the reaction vessel; a method of performing a copolymerization by charging part of the monomer components into the reaction vessel and adding the polymerization initiator and the rest of the monomer component to the reaction vessel; and a method of performing a copolymerization of charging the polymerization solvent into the reaction vessel and adding the total amount of the monomer component and the polymerization initiator to the reaction vessel, and the like. Among these methods, it is preferred to perform a copolymerization by a method of adding dropwise the polymerization initiator and the monomer component successively to the reaction vessel because the molecular weight distribution of the copolymer produced can be narrowed (sharpened) and the dispersancy in using the copolymer as a detergent builder can be improved.

The above copolymerization method may be performed by either batchwise method or continuous method. The solvent used, if necessary, in the copolymerization may be a well known solvent, and preferably used are water; alcohols such as methyl alcohol, ethyl alcohol, isopropyl alcohol; glycerin; polyethylene glycol; aromatic or aliphatic hydrocarbons such as benzene, toluene, xylene, cyclohexane, n-heptane; esters such as ethylacetate; ketones such as acetone, methyl ethyl ketone; amides such as dimethylformaldehyde; and ethers such as diethyl ether, dioxane. These solvents may be used singly or in combination of two or more species. Among others, it is preferred to use one or two or more species of solvents selected from the group consisting of water and lower alcohols having 1 to 4 carbon atoms from the viewpoint of the solubility of the monomer component and the copolymer produced.

The use amount of the above solvent is preferably 40 to 200 weight % based on 100 weight % of the monomer component. The use amount is more preferably 45 weight % or more, and furthermore preferably 50 weight % or more. And, it is more preferably 180 weight % or less, and furthermore preferably 15 weight % or less. If the use amount of the solvent is less than 10 weight %, the molecular weight of the copolymer produced may become large. If it is more than 200 weight %, the concentration of the copolymer produced may become low and thereby the removal of the solvent may be needed. The solvent may be partially or totally charged into a reaction vessel at the initial stage of the polymerization, but part of the solvent may be added (added dropwise) to the reaction system during the polymerization reaction, or the solvent in which the monomer component, the initiator and the like is previously dissolved may be added (added dropwise) to the reaction system together with these components during the polymerization reaction.

In the above copolymerization method, copolymerization conditions such as a copolymerization temperature are appropriately determined depending on a used copolymerization method, solvent, or polymerization initiator. However, generally, a copolymerization temperature is preferably 0° C. or higher and 150° C. or lower. It is more preferably 40° C. or higher, furthermore preferably 60° C. or higher and particularly preferably 80° C. or higher. And, it is more preferably 120° C. or lower, and furthermore preferably 110° C. or lower.

The above copolymerization temperature is not needed to be maintained constantly at substantially constant temperature during the polymerization reaction. For example, a method, in which the polymerization is initiated at room temperature and the temperature is raised to a set temperature in an appropriate temperature raising time or at an appropriate temperature raising rate and then the set temperature is maintained, may be adopted, or a method of varying (raising or lowering) the copolymerization temperature with time during the polymerization reaction in accordance with the method of adding dropwise the monomer component, the initiator and the like.

The above copolymerization time is preferably 30 to 300 minutes, more preferably 60 to 240 minutes and furthermore preferably 120 to 180 minutes.

The pressure condition of the reaction system in the above copolymerization method may be any of normal pressure (atmospheric pressure), reduced pressure and increased pressure. And it is preferred to perform the copolymerization under normal pressure or under increased pressure by sealing the reaction system in terms of the molecular weight of the copolymer produced. And it is preferred to perform the copolymerization under normal pressure in terms of equipment such as a pressuring apparatus, a pressure reducing apparatus, a pressure-resistant reaction vessel, or piping.

The atmosphere within the reaction system may be air atmosphere, but preferably inert atmosphere. For example, it is preferred to replace the gas within the system with an inert gas such as nitrogen before starting the polymerization.

The pH during the polymerization in the above copolymerization is preferably acid. Particularly, if the persulfate and the bisulfite are used in combination as the initiator, the polymerization is preferably performed under acid condition. The polymerization under the acid condition inhibits an increase in viscosity of the aqueous solution of the polymerization reaction system to produce the copolymer well. And the polymerization also enables the polymerization reaction to proceed under the condition of a high concentration, and whereby production efficiency can be substantially increased. Therefore, a high concentration of the polymerization, which is the final solid content of 40% or more, can be realized to produce a copolymer having the total concentration of remaining monomers contained of 15000 ppm or less. Furthermore, the polymerizing property of the amino group-containing monomer can be improved.

As the above acid condition, it is preferred that the reaction solution during the polymerization has a pH of 1 to 6 at 25° C. This pH is more preferably 5 or less, and furthermore preferably 3 or less.

The copolymer produced by the above copolymerization method can be used as a principal component and the like of a builder for detergent as-is, but it may be further neutralized with an alkali material, if necessary, to be used. Preferable examples of the alkali material include inorganic salts such as hydroxides, chlorides and carbonates of monovalent metals and divalent metals; ammonium; and organic ammonium (organic amine).

The neutralization ratio in the copolymerization can be appropriately changed depending on the initiator. For example, if the persulfate and the bisulfite are used in combination and the above other monomers can be in the form of salt, it is preferred to copolymerize the monomer components so that the neutralization ratio of the other monomers is 0 to 60 mole %. The neutralization ratio of the other monomers is represented by mole % of the other monomers composing salt if the number of total moles of the other monomers is taken as 100 mole %. When the neutralization ratio of the other monomers is more than 60 mole %, the polymerization ratio in the copolymerization step does not increase. Therefore, the molecular weight of the copolymer produced may be deteriorated or production efficiency may be reduced. The neutralization ratio is more preferably 50 mole % or less, furthermore preferably 40 mole % or less, particularly preferably 30 mole % or less, more particularly preferably 20 mole % or less, and the most preferably 10 mole % or less.

As a method of copolymerizing with the neutralization ratio of the other monomer being 0 to 60 mole %, for example, if the other monomers are the unsaturated carboxylic acid monomers, a method of subjecting unsaturated carboxylic acid monomers all of which are acid type, or unsaturated carboxylic acid monomers in which $M^2$ in the above formula (13) is a hydrogen atom in all unsaturated carboxylic acid monomer composing a copolymer to copolymerization without neutralizing, and a method of subjecting unsaturated carboxylic acid monomers neutralized with an alkali material to be in the form of salt such as sodium salt and ammonium salt in such a way that the neutralization ratio is 0 to 60 mole % are suitable.

The above water-soluble polymer is preferably used for a builder for cleaning, a water-treatment agent or a fiber-treatment agent. The builder for cleaning, the water-treatment agent or the fiber-treatment agent containing the water-soluble polymer containing the above amino group-containing monomer unit is also one of preferable embodiments of the present invention.

The above builder for cleaning includes a builder for liquid detergent and exerts an effect of preventing stains from redepositing on the clothes and the like during cleaning. If the water-soluble polymer prevents stains from redepositing, it exhibits high dispersancy because of the sharp molecular weight distribution, and together with a repulsive action resulting from a steric structure formed by the other monomers, it exhibits an effect of reducing an affinity for stain if it has a hydrophobic group derived from the other monomers and it exhibits an effect of dispersing the stains if it has a hydrophilic group derived from the other monomers. In addition, an interaction with stain varies depending on an ionic property such as an anionic property and a cationic property.

The above builder for detergent can be suitably used as a builder for liquid detergent because it has an excellent solubility in a surfactant and a detergent produced becomes a highly concentrated liquid detergent. The builder has an excellent transparency if it is used for the liquid detergent since the above builder for detergent has excellent solubility in a surfactant. Therefore, it can prevent a problem of separation of the liquid detergent resulting from the turbidity. And, it is possible to form a highly concentrated liquid detergent and to improve the cleaning power of the liquid detergent because of the excellent solubility.

The above builder for detergent can form a detergent builder having extremely high quality performance and high stability, which has an excellent anti-redeposition and further is hard to cause the reduction in performance in being stored for a long time and the deposition of impurities and the like in being maintained at low temperatures.

When the water-soluble polymer of the present invention is used as a builder for detergent, it is preferred that the anti-redeposition is 73% or more. The anti-redeposition can be determined by the following method.

<Anti-Redeposition>

(1) Whiteness of white cloths of a cotton cloth and a cotton-polyester mixed cloth used as a specimen is previously measured with reflectance. A calorimetric difference meter ND-1001 DP type (manufactured by Nippon Denshoku Industries Co., Ltd.) and the like can be used for measuring the reflectance.

(2) Pure water is added to 1.47 g of calcium chloride dihydrate to prepare 10 kg of hard water.

(3) Pure water is added to a mixture of 4.8 g of polyoxy ethylene lauryl ether sodium sulfate (AES), 0.6 g of polyoxy ethylene lauryl ether (AE), 0.6 g of sodium borate, 0.9 g of citric acid and 2.4 g of propylene glycol to form 80 g of a mixture. An aqueous solution of sodium hydroxide is added to the mixture so as to adjust a pH of the mixture to 8.2, and then to this, pure water is added to prepare 100 g of an aqueous solution of surfactant.

(4) Targotometer is set at 27° C., and 1000 ml of hard water and 0.5 g of clay in JIS class 11 are put in a pot and stirred at 100 rpm for 1 minute.

(5) 5 ml of an aqueous solution of polymer (concentration 0.28%), 4.8 ml of the aqueous solution of surfactant prepared in the step (3) and 5.2 to 5.4 g of the white cloths are put in a pot and stirred at 100 rpm for 10 minutes.

(6) The white cloths are wringed by hand, and 1 liter of hard water is put in a pot and stirred at 100 rpm for 2 minutes.

(7) Operations of the steps 4 to 6 are repeated three times.

(8) The white cloths are pressed with a filler cloth to dry them while smoothing wrinkles. The dried artificially soiled fabrics were measured for the whiteness again with reflectance with a colorimetric difference meter.

(9) From these measurements, the anti-redeposition is determined using the following equation.

$$\text{Anti-redeposition (\%)} = (\text{whiteness after cleaning})/(\text{whiteness of original white cloth}) \times 100$$

The content ratio of the water-soluble polymer in the above builder for detergent is preferably, for example, 0.1 to 80 weight % based on 100 weight % of the builder for detergent. If this content ratio is less than 0.1 weight %, detergency in using the polymer as a detergent composition may become insufficient. And more than 80 weight % of the content ratio is uneconomical. The content ratio of the water-soluble polymer is more preferably 1 weight % or more, and furthermore preferably 5 weight % or more. And, it is more preferably 70 weight % or less, and furthermore preferably 65 weight % or less.

Other components other than the water-soluble polymer and their blending ratios in the above builder for detergent can be appropriately determined based on various components and their blending ratios, which can be used in the well-known builder for detergent, unless the functional effects of the present invention are sacrificed.

The above water-soluble polymer can exert performance such as dispersancy in various applications and can be suitably used in other applications such as a water-treatment agent, a dispersant, a fiber-treatment agent, a scale preventive agent (scale inhibitor), a cement additive, a sequestrant, a thickener and various binders.

The above water-treatment agent is added to a water system such as a cooling water system and a boiler water system. In this case, the water-soluble polymer may be added as-is or the water-treatment agent containing other components other than the water-soluble polymer may be added. Other components other than the water-soluble polymer and their blending ratio in the water-treatment agent can be approximately determined based on the various components and their blending ratios, which can be used in the conventionally well known water-treatment agents, unless the functional effects of the present invention are sacrificed.

The above dispersant may be an aqueous dispersant, and for example, a pigment dispersant, a cement dispersant, a dispersant for calcium carbonate and a dispersant for kaolin are suitable. Such a dispersant can exert an extremely excellent dispersancy which the water-soluble polymer has inherently. And the dispersant has an extremely high quality performance and high stability, which is hard to cause the reduction in performance in being stored for a long time and the deposition of impurities in being maintained at low temperatures. Other components other than the water-soluble polymer and their blending ratios in the dispersant can be approximately determined based on the various components and their blending ratios, which can be used in the conventionally well known dispersant, unless the functional effects of the present invention are sacrificed.

If the water-soluble polymer of the present invention is used as a builder for detergent, a detergent composition containing the builder for detergent may be a powder detergent composition or may be a liquid detergent composition. The above detergent composition may contain additives usually used in detergents in addition to the above builder for detergent. As the additives, suitably used are an alkali builder, a chelate builder, a redeposition inhibitor for preventing a contaminant from redepositing, such as sodium carboxymethylcellulose, a stain inhibitor such as benzotriazole and ethylenethiourea, a soil releasing agent, a color transfer inhibitor, a softening agent, an alkali material for controlling a pH, a perfume, a solubilizing agent, a fluorescer, a coloring agent, a foaming agent, a foam stabilizer, a lustering agent, a fungicide, a bleaching agent, a bleaching assistant, an enzyme, a dye and a solvent. And if the detergent composition is a powder detergent composition, it preferably contains zeolite.

The blending ratio of the above builder for detergent is generally 0.1 to 20 weight % based on 100 weight % of the detergent composition, more preferably 0.2 weight % or more and 15 weight % or less, furthermore preferably 0.3 weight % or more and 10 weight % or less, particularly preferably 0.4 weight % or more and 8 weight % or less, and the most preferably 0.5 weight % or more and 5 weight % or less. If the blending ratio of the builder for detergent is less than 0.1 weight %, the builder may exhibit insufficient detergent performance. If it is more than 20 weight %, economic efficiency may be deteriorated.

The blending form of the above water-soluble polymer in the above detergent composition may be any form of liquid or solid and can be determined in accordance with the form when the detergent is sold (for example, liquid article or solid article). It may be blended in the form of an aqueous solution after polymerization, or may be blended in a state of being concentrated by reducing a water content of the aqueous solution to some extent, or may be blended in a state of being dried for solidification.

Further, the above detergent composition also includes a detergent used for only a specific application such as a bleaching detergent, in which one function of the component is enhanced, in addition to synthetic detergents for household detergents, industrial detergents for a fiber industry or the like and a hard surface detergent. The water-soluble polymer of the present invention has an excellent ability to stabilize a bleaching agent because its excellent chelating performance can stabilize hydrogen peroxide by catching a trace of metal. Therefore the water-soluble polymer can be suitably used.

The above surfactant is at least one species selected from anionic surfactants, nonionic surfactants, cationic surfactants and amphoteric surfactants, and these surfactants may be used singly or in combination of two or more species. If two or more species of the surfactants are used, the use amount of the total of the anionic surfactants and the nonionic surfactants is preferably 50 weight % or more based on 100 weight % of the total surfactants. The use amount is more preferably 60 weight % or more, furthermore preferably 70 weight % or more, and particularly preferably 80 weight % or more.

Preferred examples of the above anionic surfactants include alkylbenzene sulfonate, alkyl ether sulfate, alkenyl ether sulfate, alkyl sulfate, alkenyl sulfate, α-olefin sulfonate, α-sulfofatty acid or ester salt, alkane sulfonate, saturated fatty acid salt, unsaturated fatty acid salt, alkyl ether carboxylate, alkenyl ether carboxylate, amino acid surfactant, N-acylamino acid surfactant, alkyl phosphate ester or salt thereof, and alkenyl phosphate ester or salt thereof.

An alkyl group and an alkenyl group in the above anionic surfactant may have a branched alkyl group such as a methyl group.

Preferred examples of the above nonionic surfactant include polyoxyalkylene alkyl ether, polyoxyalkylene alkenyl ether, polyoxyethylene alkylphenyl ether, higher fatty acid alkanolamide or alkylene oxide adduct thereof, sucrose fatty acid ester, alkyl glycoxide, fatty acid glycerol monoester and alkylamine oxide. An alkyl group and an alkenyl group in the above nonionic surfactant may have a branched alkyl group such as a methyl group.

As the above cationic surfactant, quaternary ammonium salt and the like is suitable.

As the above amphoteric surfactant, a carboxyl type amphoteric surfactant and a sulfobetaine type amphoteric surfactant and the like are suitable.

An alkyl group and an alkenyl group in the above cationic surfactant and the above amphoteric surfactant may have a branched alkyl group such as a methyl group.

It is preferable that the blending ratio of the above surfactant is typically 10 to 60 weight % based on 100 weight % of the detergent composition, more preferably 15 weight % or more and 50 weight % or less, furthermore preferably 20 weight % or more and 45 weight % or less, and particularly preferably 25 weight % or more and 40 weight % or less. If the blending ratio of the surfactant is less than 10 weight %, sufficient detergency may not be exhibited and if the blending ratio is more than 60 weight %, economic efficiency may be deteriorated.

If the above detergent composition is a liquid detergent composition, it is preferred that the moisture amount contained in the liquid detergent composition is typically 0.1 to 75 weight % based on 100 weight % of the liquid detergent composition, more preferably 0.2 weight % or more and 70 weight % or less, furthermore preferably 0.5 weight % or more and 65 weight % or less, particularly preferably 0.7 weight % or more and 60 weight % or less, more particularly preferably 1 weight % or more and 55 weight % or less, and the most preferably 1.5 weight % or more and 50 weight % or less.

The above liquid detergent composition preferably has a kaolin turbidity of 200 mg/l or less, more preferably 150 mg/l or less, furthermore preferably 120 mg/l or less, particularly preferably 100 mg/l or less, and the most preferably 50 mg/l or less. The difference in kaolin turbidity between the case of adding the water-soluble polymer of the present invention to the liquid detergent composition as a builder for detergent and the case of not adding it is preferably 500 mg/l or less, more preferably 400 mg/l or less, furthermore preferably 300 mg/l or less, particularly preferably 200 mg/l or less, and the most preferably 100 mg/l or less. The kaolin turbidity can be measured by a measuring method mentioned below, for example.

<Measurement Method of Kaolin Turbidity>

A sample (liquid detergent) homogeneously stirred is charged in a 50 mm×50 mm square cell with 10 mm thickness and bubbles are removed. Then, the sample is measured for Turbidity (kaolin turbidity: mg/L) at 25° C. using NDH 2000 (trade name, turbidimeter) manufactured by NIPPON DENSHOKU INDUSTRIES CO., LTD.

Preferred examples of an enzyme blended with the above detergent composition include protease, lipase, and cellulase. Among them, protease, alkali lipase and alkali cellulase are preferable because of these high activities in alkali washings.

The added amount of the above enzyme is preferably 5 weight % or less based on 100 weight % of the detergent composition. If the added amount is more than 5 weight %, detergency is not improved to reduce economic efficiency.

Preferable examples of the above alkali builder include silicate, carbonate and sulfate. Preferable examples of the above chelate builder include diglycollic acid, oxycarboxylate, EDTA (ethylenediaminetetraacetic acid), DTPA (diethylenetriaminepentaacetic acid), triphosphate, sodium tripolyphosphate and citric acid. Other water-soluble polycarboxylic acid polymers other than the copolymer in the present invention may be used.

The above detergent composition can form a detergent having extremely high quality performance and high stability, which has an excellent dispersancy and further is hard to cause the reduction in performance in being stored for a long time and the deposition of impurities and the like in being maintained at low temperatures.

The amino-group containing water-soluble copolymer of the present invention has the above-mentioned configuration and has an excellent chelating performance and clay dispersancy. And the method of the present invention, in which the amino-group containing water-soluble copolymer is produced efficiently and with high productivity, can be suitably applied to applications such as builders for cleaning (including builders for liquid detergent), water-treatment agents and fiber-treatment agents. And the builder for detergent containing the water-soluble polymer of the present invention has a high solubility in a liquid detergent and can exert high fundamental performance in terms of the anti-redeposition and a cleaning rate and the like. Therefore, the amino-group containing water-soluble copolymer is useful as a detergent, for example, if used together with a surfactant.

BEST MODES FOR CARRYING OUT THE INVENTION

Hereinafter, the present invention will be described in more detail with reference to Examples, but the present invention is not limited to these Examples. Furthermore, "part" refers to "part by weight" and "%" refers to "% by weight (% by mass or mass %)" unless otherwise specified.

[Synthesis of Amino Group-Containing Allyl Monomer]

A synthetic method of an iminodiacetic acid derivative monomer of allyl glycidyl ether (AGE-IDA) will be described below, as a synthetic example of an amino group-containing allyl monomer.

Into a 2.5 liter SUS separable flask equipped with a reflux condenser and a stirrer, 500.0 g of pure water, 399.3 g of iminodiacetic acid (IDA) and 500.0 g of a 48% aqueous solution of sodium hydroxide (hereinafter, abbreviated as 48% NaOH) were charged, and a temperature of the mixture was adjusted to 55° C. while stirring the mixture. Then, 342.4 g of allyl glycidyl ether (AGE) was slowly added dropwise to a reaction system maintained at 55° C. over two hours while stirring. On completion of adding dropwise, the reaction solution was further aged at 55° C. for 1 hour to produce a 50% aqueous solution of AGE-IDA (hereinafter, abbreviated as 50% AGE-IDA).

Example 1

Into a 2.5 liter SUS separable flask equipped with a reflux condenser and a stirrer, 68.0 g of pure water, 58.2 g of a 50% aqueous solution of AGE-IDA and 0.0127 g of Mohr's salt were charged in the ratios shown in Table 1, and a temperature of the resulting mixture was raised to a boiling point while stirring the mixture.

Then, to the polymerization reaction system maintained at the boiling point, 144.0 g of a 80% aqueous solution of acrylic acid (hereinafter, abbreviated as 80% AA), 174.6 g of 50% AGE-IDA, 26.7 g of a 15% aqueous solution of sodium persulfate (hereinafter, abbreviated as 15% NaPS) and 17.1 g of 35% hydrogen peroxide water (hereinafter, abbreviated as 35% $H_2O_2$) were added dropwise from separate nozzles, respectively, while stirring the polymerization reaction system.

The drop time of the 80% AA and 35% $H_2O_2$ was 120 minutes on, the drop time of the 50% AGE-IDA was 80 minutes and the drop time of the 15% NaPS was 130 minutes. The dropping operation was continuously carried out and the dropping rate of each compound was constant during the dropping. In Tables 1 to 3, a charge ratio (mole ratio) of AGE-IDA and AA is represented by AGE-IDA/AA.

On completion of the adding dropwise, the polymerization reaction solution was further aged for 30 minutes to complete the polymerization. On the completion of the polymerization, the polymerization reaction solution, which is an aqueous solution containing a polymer mixture, was left standing to be cooled, and 113.3 g of the 48% NaOH was gradually added dropwise to the polymerization reaction solution while being stirred to neutralize the polymerization reaction solution. The solid content in the neutralized polymerization reaction solution was 45 weight %. The produced polymer 1 has a weight-average molecular weight of 405000, a molecular weight distribution of 11.3 and a total concentration of remaining monomers of 1300 ppm. Table 4 shows the results of the measurement.

Examples 2 to 9

Reactions were performed in the same manner as in Example 1 under the conditions shown in Table 1 to produce polymers 2 to 9. Tables 1 and 4 show the results.

Example 10

A reaction was performed in the same manner as in Example 1 under the conditions shown in Table 2 except that 35% sodium hydrogensulfite (35% SBS) is used as a reducing agent to produce a polymer 10. Tables 2 and 4 show the results.

Comparative Example 1

A reaction was performed in the same manner as in Example 1 under the conditions shown in Table 3 to produce a comparative polymer. Tables 3 and 4 show the results.

TABLE 2-continued

|  |  |  | Example 10 |
|---|---|---|---|
|  | 15% NaPS | (g) | 53.3 |
|  |  | (g/mol) | 4.0 |
| Time of adding dropwise | 80% AA | (min) | 0-180 |
|  | 50% AGE-IDA | (min) | 0-90 |
|  | 35% SBS | (min) | 0-170 |
|  | 15% NaPS | (min) | 0-190 |
| Polymerization and aging temperature |  | (° C.) | boiling point |
| Aging time |  | (min) | 30.0 |
| Aftertreatment | 48% NaOH | (g) | 141.7 |
|  |  | (mol) | 1.7 |
| Final solid content |  | (%) | 40.0 |
| Final neutralization degree |  | (%) | 100.0 |
| Total charge |  | (g) | 697.7 |

TABLE 1

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| AGE-IDA/AA |  | (mol) | 20/80 | 20/80 | 20/80 | 20/80 | 25/75 | 25/75 | 25/75 | 25/75 | 40/60 |
| Initial charge | 50% AGE-IDA | (g) | 58.2 | 58.2 | 58.2 | 58.2 | 58.2 | 58.2 | 58.2 | 58.2 | 349.2 |
|  |  | (mol) | 0.10 | 0.10 | 0.10 | 0.10 | 0.10 | 0.10 | 0.10 | 0.10 | 0.60 |
|  | Mohr's salt | (g) | 0.0127 | 0.0127 | 0.0127 | 0.0148 | 0.0157 | 0.0158 | 0.0159 | 0.0155 | 0.0143 |
|  |  | (ppm) | 3.0 | 3.0 | 3.0 | 3.0 | 3.0 | 3.0 | 3.0 | 3.0 | 3.0 |
|  | water | (g) | 68.0 | 62.0 | 56.0 | 115.0 | 145.0 | 125.0 | 105.0 | 115.0 | 100.0 |
| Adding dropwise | 80% AA | (g) | 144.0 | 144.0 | 144.0 | 144.0 | 135.0 | 135.0 | 135.0 | 135.0 | 81.0 |
|  |  | (mol) | 1.6 | 1.6 | 1.6 | 1.6 | 1.5 | 1.5 | 1.5 | 1.5 | 0.9 |
|  | 50% AGE-IDA | (g) | 174.6 | 174.6 | 174.6 | 174.6 | 232.8 | 232.8 | 232.8 | 232.8 | 0.0 |
|  |  | (mol) | 0.30 | 0.30 | 0.30 | 0.30 | 0.40 | 0.40 | 0.40 | 0.40 | 0.00 |
|  | 35% H$_2$O$_2$ | (g) | 17.1 | 22.9 | 28.6 | 45.7 | 22.9 | 34.3 | 45.7 | 68.6 | 34.3 |
|  |  | (g/mol) | 3.0 | 4.0 | 5.0 | 8.0 | 4.0 | 6.0 | 8.0 | 12.0 | 8.0 |
|  | 15% NaPS | (g) | 26.7 | 26.7 | 26.7 | 53.3 | 26.7 | 40.0 | 53.3 | 0.0 | 40.0 |
|  |  | (g/mol) | 2.0 | 2.0 | 2.0 | 4.0 | 2.0 | 3.0 | 4.0 | 0.0 | 4.0 |
| Time of adding dropwise | 80% AA | (min) | 0-120 | 0-120 | 0-120 | 0-240 | 0-180 | 0-180 | 0-180 | 0-180 | 0-180 |
|  | 50% AGE-IDA | (min) | 0-80 | 0-90 | 0-100 | 0-210 | 0-100 | 0-130 | 0-150 | 0-150 | — |
|  | 35% H$_2$O$_2$ | (min) | 0-120 | 0-120 | 0-120 | 0-240 | 0-180 | 0-180 | 0-180 | 0-180 | 0-180 |
|  | 15% NaPS | (min) | 0-130 | 0-130 | 0-130 | 0-250 | 0-190 | 0-190 | 0-190 | — | 0-190 |
| Polymerization and aging temperature |  | (° C.) | boiling point | boiling point | boiling point | boiling point | boiling point | boiling point | boiling point | boiling point | boiling point |
| Aging time |  | (min) | 30.0 | 30.0 | 30.0 | 30.0 | 30.0 | 30.0 | 30.0 | 30.0 | 30.0 |
| Aftertreatment | 48% NaOH | (g) | 113.3 | 113.3 | 113.3 | 113.3 | 125.0 | 125.0 | 125.0 | 125.0 | 75.0 |
|  |  | (mol) | 1.4 | 1.4 | 1.4 | 1.4 | 1.5 | 1.5 | 1.5 | 1.5 | 0.9 |
| Final solid content |  | (%) | 45.0 | 45.0 | 45.0 | 40.0 | 40.0 | 40.0 | 40.0 | 40.0 | 40.0 |
| Final neutralization degree |  | (%) | 90.0 | 90.0 | 90.0 | 90.0 | 100.0 | 100.0 | 100.0 | 100.0 | 100.0 |
| Total charge |  | (g) | 601.9 | 601.7 | 601.4 | 704.2 | 745.5 | 750.3 | 755.0 | 734.6 | 679.5 |

TABLE 2

|  |  |  | Example 10 |
|---|---|---|---|
| AGE-IDA/AA |  | (mol) | 15/85 |
| Initial charge | 50% AGE-IDA | (g) | 0.0 |
|  |  | (mol) | 0.00 |
|  | Mohr's salt | (g) | 0.0147 |
|  |  | (ppm) | 3.0 |
|  | water | (g) | 110.0 |
| Adding dropwise | 80% AA | (g) | 153.0 |
|  |  | (mol) | 1.7 |
|  | 50% AGE-IDA | (g) | 194.0 |
|  |  | (mol) | 0.30 |
|  | 35% SBS | (g) | 45.7 |
|  |  | (g/mol) | 8.0 |

TABLE 3

|  |  |  | Comparative Example 1 |
|---|---|---|---|
| AGE-IDA/AA |  | (mol) | 20/80 |
| Initial charge | 50% AGE-IDA | (g) | 573.0 |
|  |  | (mol) | 0.98 |
|  | Mohr's salt | (g) | 0.0000 |
|  |  | (ppm) | 0.0 |
|  | water | (g) | 449.5 |
| Adding dropwise | 80% AA | (g) | 354.4 |
|  |  | (mol) | 3.9 |
|  | 50% AGE-IDA | (g) | 0.0 |
|  |  | (mol) | 0.00 |
|  | 35% H$_2$O$_2$ | (g) | 0.0 |
|  |  | (g/mol) | 0.0 |

TABLE 3-continued

|  |  |  | Comparative Example 1 |
|---|---|---|---|
| | 15% NaPS | (g) | 123.1 |
| | | (g/mol) | 5.0 |
| Time of adding dropwise | 80% AA | (min) | 0-60 |
| | 50% AGE-IDA | (min) | — |
| | 35% H$_2$O$_2$ | (min) | — |
| | 15% NaPS | (min) | 0-60 |
| Polymerization and aging temperature | | (° C.) | 95.0 |
| Aging time | | (min) | 10.0 |
| Aftertreatment | 48% NaOH | (g) | 0.0 |
| | | (mol) | 0.0 |
| Final solid content | | (%) | 40.0 |
| Final neutralization degree | | (%) | 33.4 |
| Total charge | | (g) | 1500.0 |

The molecular weights, the total concentrations of the remaining monomers, the clay dispersancy, the stabilization abilities to hydrogen peroxide and the anti-redeposition of the polymers produced in the above Examples and Comparative Example were measured according to the following methods. Table 4 shows the results of the measurement.

<<Molecular Weight Measurement>>

Both of the weight-average molecular weight (Mw) and the number-average molecular weight (Mn) of the acrylic acid (acrylate) polymer were measured by GPC (gel permeation chromatography). Measuring conditions and apparatus and the like are exemplified as follows.

(1) column for GPC; GF-7 MHQ (trade name) manufactured by SHOWA DENKO K.K. is given.
(2) Mobile phase; Pure water was added to 34.5 g of disodium hydrogenphosphate 12-hydrate and 46.2 g of sodium dihydrogen phosphate dihydrate (both are special grade chemicals) in a concentration drier to form a 5000 g of an aqueous solution and then this aqueous solution was used as a mobile phase after being filtered with a membrane filter of 0.45 μm.
(3) Detector; Model 481 manufactured by Nihon Waters K.K. was used at a UV detection wavelength of 214 nm.
(4) Pump; L-7110 (trade name) manufactured by Hitachi, Ltd. was used.
(5) Flow rate of mobile phase; 0.5 ml/minute, and a temperature of 35° C.

A calibration curve is prepared using a standard sample of polysodium acrylate produced by Sowa Science Corporation.

<Total Concentration of the Remaining Monomers>

This is the total concentration of an allyl monomer and (meth) acrylic acid which are contained in the aqueous solution of finally produced copolymer and remain without polymerizing. The quantitation was performed by HPLC.

Column: G-3000PWXL manufactured by TOSOH CORPORATION

Mobile phase: Pure water was added to 5 ml of phosphoric acid (special grade chemicals) to form a 5000 g of an aqueous solution and then this aqueous solution was used as a mobile phase after being filtered with a membrane filter of 0.45 μm.

Detector: Model L-4000H manufactured by Hitachi, Ltd. was used at a UV detection wavelength of 220 nm.

Pump: Model L-60000 manufactured by Hitachi, Ltd. was used.

Flow rate of mobile phase; 1 ml/minute, and a temperature of 35° C.

<Clay Dispersancy in High Hardness Water>

(1) First, ion-exchanged water was added to a mixture of 67.56 g of glycine, 52.6 g of sodium chloride and a 60 ml of 1 mol/l aqueous solution of NaOH to prepare 600 g of a glycine buffer solution.

(2) Pure water was added to 0.3268 g of calcium chloride dihydrate and 60 g of the prepared solution of (1) to prepare 1000 g of a dispersant. And a 0.1% aqueous solution of polymer on the solid content equivalent basis was prepared.

(3) 0.3 g of clay of JIS test powders I, class 8 (Kanto loam, fine particles: The association of Powder Process Industry and Engineering Japan) was put in an about 30 cc common experimental test tube, and to this, 27 g of the dispersion prepared in the step (2) and 3 g of the 0.1% aqueous solution of polymer prepared in the step (2) on the solid content equivalent basis were added. In this time, the calcium concentration of the test solution was 200 ppm on the calcium carbonate equivalent basis.

(4) After the test tube was sealed with a paraffin film, it was shaken lightly in such a way that the clay was dispersed over all and further shaken up and down 20 times. This test tube was left standing for 20 hours in an area not exposed to direct sunlight, and then 5 ml of a supernatant of the dispersion was sampled with a whole pipet.

(5) Absorbance (ABS) of this solution was measured in a 1 cm cell at a wavelength of 380 nm using an ultraviolet spectrometer and the value measured is assumed to be a value of clay dispersancy in high hardness water <Stabilization Ability to Hydrogen Peroxide>

(1) An inner cap of a 250 ml polymer bottle was provided with a pinhole.
(2) 10 g of a 2.5% aqueous solution of polymer was prepared.
(3) 100 g of a heavy metal ion mixed aqueous solution of 0.106% Mohr's salt and 0.0197% copper sulfate was prepared.
(4) A 0.1% aqueous solution of magnesium sulfate was prepared.
(5) 48% sodium hydroxide and 35% oxygenated water were prepared.
(6) Then, the following materials were put in the 250 ml polymer bottle in this order.

| (i) Heavy metal ion mixed aqueous solution | 1 ml |
| (ii) A 2.5% aqueous solution of polymer | 4 ml |
| (iii) Pure water | 80 g |
| (iv) A 0.1% aqueous solution of magnesium sulfate | 10 ml |
| (v) 48% sodium hydroxide | 2 ml |
| (vi) 35% oxygenated water | 3 ml |

(7) The resulting mixture was left standing for 2 hours in a constant temperature bath of 50° C., and then the concentration of hydrogen peroxide in the solution was measured by an oxidation-reduction titration method. The value measured is assumed to be a value of stabilization ability to hydrogen peroxide.

<Anti-Redeposition>

(1) Whiteness of white cloths of a cotton cloth and a cotton-polyester mixed cloth each used as a specimen was previously measured with reflectance. A calorimetric difference meter ND-1001 DP type (manufactured by Nippon Denshoku Industries Co., Ltd.) and the like could be used for measuring the reflectance.

(2) Pure water was added to 1.47 g of calcium chloride dihydrate to prepare 10 kg of hard water.

(3) Pure water was added to a mixture of 4.8 g of polyoxy ethylene lauryl ether sodium sulfate (AES), 0.6 g of polyoxy ethylene lauryl ether (AE), 0.6 g of sodium borate, 0.9 g of citric acid and 2.4 g of propylene glycol to form 80 g of a mixture. An aqueous solution of sodium hydroxide was added to the mixture so as to adjust a pH of the mixture to 8.2, and then to this, pure water was added to prepare 100 g of an aqueous solution of surfactant.
(4) Targotometer was set at 27° C., and 1000 ml of hard water and 0.5 g of clay in JIS class 11 were put in a pot and stirred at 100 rpm for 1 minute.
(5) 5 ml of an aqueous solution of polymer (concentration 0.28%), 4.8 ml of the aqueous solution of surfactant prepared in the step (3) and 5.2 to 5.4 g of the white cloths were put in a pot and stirred at 100 rpm for 10 minutes.
(6) The white cloths were wringed by hand, and 1 liter of hard water was put in a pot and stirred at 100 rpm for 2 minutes.
(7) Operations of the steps (4) to (6) were repeated three times.
(8) The white cloths were pressed with a filler cloth to dry them while smoothing wrinkles and then the white cloths were measured for the whiteness again with reflectance with a calorimetric difference meter.
(9) From these measurements, the anti-redeposition was determined using the following equation.

Anti-redeposition (%)=(whiteness after cleaning)/(whiteness of original white cloth)×100

TABLE 4

| | Amine monomer/ AA | Weight-average molecular weight Mw | Molecular weight distribution Mw/Mn | Total concentration of remaining monomers ppm | Power to disperse clay | Power to stabilize hydrogen peroxide % | Power to prevent recontamination % |
|---|---|---|---|---|---|---|---|
| Polymer (1) | 20/80 | 40500 | 11.3 | 1300 | 1.0 | 87 | 73.1 |
| Polymer (2) | 20/80 | 34500 | 10.8 | 1100 | 1.1 | 86 | 73.1 |
| Polymer (3) | 20/80 | 27000 | 9.8 | 900 | 1.2 | 86 | 73.3 |
| Polymer (4) | 20/80 | 9000 | 5.3 | 400 | 1.4 | 88 | 73.4 |
| Polymer (5) | 25/75 | 18000 | 7.0 | 1300 | 1.4 | 97 | 73.3 |
| Polymer (6) | 25/75 | 12000 | 6.0 | 1000 | 1.4 | 96 | 73.4 |
| Polymer (7) | 25/75 | 9500 | 5.6 | 500 | 1.5 | 99 | 73.2 |
| Polymer (8) | 40/60 | 10000 | 5.0 | 4900 | 1.0 | 98 | 73.0 |
| Polymer (9) | 40/60 | 10000 | 5.0 | 2400 | 1.4 | 92 | 73.1 |
| Polymer (10) | 15/85 | 17000 | 5.6 | 800 | 1.5 | 84 | 73.3 |
| Comparative polymer | 20/80 | 97000 | 18.5 | 18000 | 0.6 | 77 | 72.5 |

Table 4 clearly shows that good stabilization ability to hydrogen peroxide and anti-redeposition can be attained in the molecular weight distribution of 12 or less.

The present application claims priority under 35 U.S.C. §119 to Japanese Patent Application No. 2004-360883 filed Dec. 14, 2004, entitled "AMINO GROUP-CONTAINING WATER-SOLUBLE COPOLYMER." The contents of that application are incorporated herein by reference in their entirely.

The invention claimed is:

1. A water-soluble polymer containing an amino group-containing monomer unit,
wherein the water-soluble polymer has a molecular weight distribution of 12 or less;
wherein the water-soluble polymer has a weight-average molecular weight of 5000 to 100000;
wherein the amino group-containing monomer unit is represented by the following formula (1);

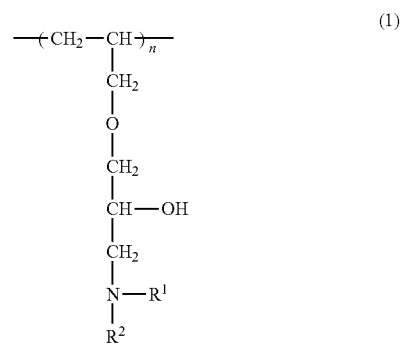

in the formula, $R^1$ and $R^2$ are the same or different from each other and each represents a hydrogen atom or an organic group; and wherein the water-soluble polymer is produced by using an initiator containing a heavy metal ion and sulfurous acid (sulfite), hydrogen sulfite or hydrogen peroxide as essential components.

2. The water-soluble polymer according to claim 1,
wherein in the amino group-containing monomer unit, the $R^1$ and $R^2$ in the formula (1) are the same or different from each other and each represent a group selected from the group consisting of
(I) a hydrogen atom,
(II) an organic group having a carboxylic acid group or a group in a form of salt thereof,
(III) an organic group having a sulfonic acid group or a group in a form of salt thereof,
(IV) an organic group having a hydroxyl group, and
(V) an organic group having an amino group.

3. The water-soluble polymer according to claim 1, wherein in the amino group-containing monomer unit, $R^1$ and $R^2$ in the formula (1) are the same or different from each other and each represent a group selected from the group consisting of the following formulas (2) to (10);

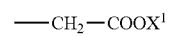

-continued

—CH₂—CH₂—COOX² (3)

—CH₂—CH₂—SO₃X³ (4)

—CH₂—CH₂—OH (5)

—CH₂—CH₂—NH₂ (6)

—CH₂—CH₂—N(R³)—R⁴ (7)

—CH(COOX⁴)—CH₂—COOX⁵ (8)

—CH(COOX⁶)—CH₂—CH₂—COOX⁷ (9)

—CH(COOX⁸)—CH(COOX⁹)—OH (10)

in the formula, $X^1$ to $X^9$ are independent of each other and each represent a hydrogen atom, an alkali metal, an alkaline-earth metal, an ammonium group or an organic amine group, and $R^3$ and $R^4$ are the same as the $R^1$ and $R^2$, respectively, or each represent an alkyl group or an aryl group having 1 to 12 carbon atoms.

4. A method of producing the water-soluble polymer according to claim 1,
wherein the method comprises a step of polymerizing an amino group-containing allyl monomer using an initiator containing a heavy metal ion and sulfurous acid (sulfite), hydrogensulfite or hydrogen peroxide.

5. The water-soluble polymer according to claim 1,
wherein the water-soluble polymer is used for a builder for cleaning, a water-treatment agent or a fiber-treatment agent.

6. The water-soluble polymer according to claim 2,
wherein in the amino group-containing monomer unit, $R^1$ and $R^2$ in the formula (1) are the same or different from each other and each represent a group selected from the group consisting of the following formulas (2) to (10);

—CH₂—COOX¹ (2)

—CH₂—CH₂—COOX² (3)

—CH₂—CH₂—SO₃X³ (4)

—CH₂—CH₂—OH (5)

—CH₂—CH₂—NH₂ (6)

—CH₂—CH₂—N(R³)—R⁴ (7)

—CH(COOX⁴)—CH₂—COOX⁵ (8)

—CH(COOX⁶)—CH₂—CH₂—COOX⁷ (9)

—CH(COOX⁸)—CH(COOX⁹)—OH (10)

in the formula, $X^1$ to $X^9$ are independent of each other and each represent a hydrogen atom, an alkali metal, an alkaline-earth metal, an ammonium group or an organic amine group, and $R^3$ and $R^4$ are the same as the $R^1$ and $R^2$, respectively, or each represent an alkyl group or an aryl group having 1 to 12 carbon atoms.

7. A method of producing the water-soluble polymer according to claim 2,
wherein the method comprises a step of polymerizing an amino group-containing allyl monomer using an initiator containing a heavy metal ion and sulfurous acid (sulfite), hydrogensulfite or hydrogen peroxide.

8. A method of producing the water-soluble polymer according to claim 3,
wherein the method comprises a step of polymerizing an amino group-containing allyl monomer using an initiator containing a heavy metal ion and sulfurous acid (sulfite), hydrogensulfite or hydrogen peroxide.

9. The water-soluble polymer according to claim 2,
wherein the water-soluble polymer is used for a builder for cleaning, a water-treatment agent or a fiber-treatment agent.

10. The water-soluble polymer according to claim 3,
wherein the water-soluble polymer is used for a builder for cleaning, a water-treatment agent or a fiber-treatment agent.

11. A method of producing the water-soluble polymer according to claim 6,
wherein the method comprises a step of polymerizing an amino group-containing allyl monomer using an initiator containing a heavy metal ion and sulfurous acid (sulfite), hydrogensulfite or hydrogen peroxide.

12. The water-soluble polymer according to claim 6,
wherein the water-soluble polymer is used for a builder for cleaning, a water-treatment agent or a fiber-treatment agent.

13. The water-soluble polymer according to claim 7,
wherein the water-soluble polymer is used for a builder for cleaning, a water-treatment agent or a fiber-treatment agent.

14. The water-soluble polymer according to claim 8,
wherein the water-soluble polymer is used for a builder for cleaning, a water-treatment agent or a fiber-treatment agent.

15. The water-soluble polymer according to claim 11,
wherein the water-soluble polymer is used for a builder for cleaning, a water-treatment agent or a fiber-treatment agent.

16. The water-soluble polymer according to claim 1,
wherein the water-soluble polymer has a weight-average molecular weight of 5000 to 60000.

17. The water-soluble polymer according to claim 16,
wherein in the amino group-containing monomer unit, $R^1$ and $R^2$ in the formula (1) are the same or different from each other and each represent a group selected from the group consisting of the following formulas (2) to (10);

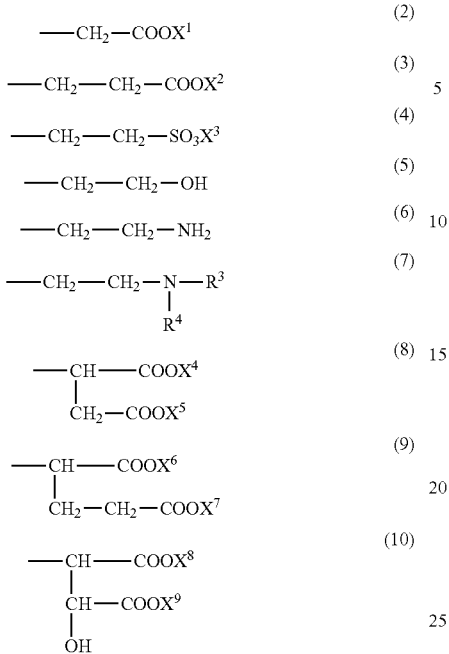

in the formula, $X^1$ to $X^9$ are independent of each other and each represent a hydrogen atom, an alkali metal, an alkaline-earth metal, an ammonium group or an organic amine group, and $R^3$ and $R^4$ are the same as the $R^1$ and $R^2$, respectively, or each represent an alkyl group or an aryl group having 1 to 12 carbon atoms.

18. The water-soluble polymer according to claim 17, wherein the water-soluble polymer is used for a builder for cleaning, a water-treatment agent or a fiber-treatment agent.

19. The water-soluble polymer according to claim 1, wherein the water-soluble polymer is produced by using an initiator containing a heavy metal ion and sulfurous acid (sulfite) as essential components.

20. The water-soluble polymer according to claim 19, wherein in the amino group-containing monomer unit, $R^1$ and $R^2$ in the formula (1) are the same or different from each other and each represent a group selected from the group consisting of the following formulas (2) to (10);

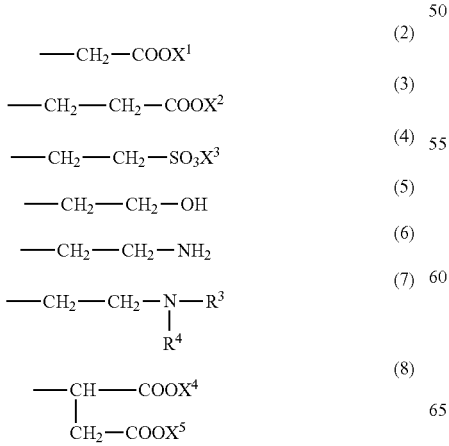
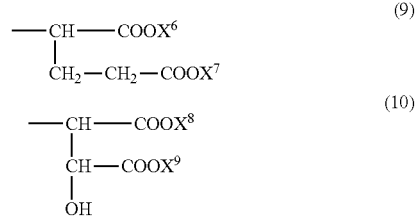

in the formula, $X^1$ to $X^9$ are independent of each other and each represent a hydrogen atom, an alkali metal, an alkaline-earth metal, an ammonium group or an organic amine group, and $R^3$ and $R^4$ are the same as the $R^1$ and $R^2$, respectively, or each represent an alkyl group or an aryl group having 1 to 12 carbon atoms.

21. The water-soluble polymer according to claim 19, wherein the water-soluble polymer is used for a builder for cleaning, a water-treatment agent or a fiber-treatment agent.

22. An aqueous solution containing the water-soluble polymer according to claim 1, wherein the aqueous solution has a solid content of 40% or more of the water-soluble polymer; and the aqueous solution has a total concentration of unreacted monomers of 15000 ppm or less.

23. The aqueous solution according to claim 22, wherein in the amino group-containing monomer unit, $R^1$ and $R^2$ in the formula (1) are the same or different from each other and each represent a group selected from the group consisting of the following formulas (2) to (10);

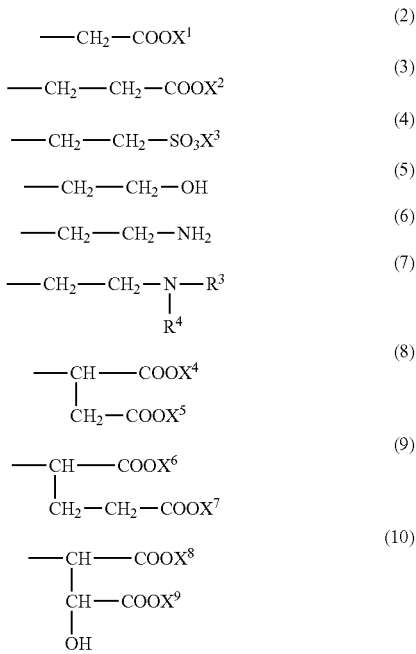

in the formula, $X^1$ to $X^9$ are independent of each other and each represent a hydrogen atom, an alkali metal, an alkaline-earth metal, an ammonium group or an organic amine group, and $R^3$ and $R^4$ are the same as the $R^1$ and $R^2$, respectively, or each represent an alkyl group or an aryl group having 1 to 12 carbon atoms.

24. The aqueous solution according to claim 22, wherein the water-soluble polymer is used for a builder for cleaning, a water-treatment agent or a fiber-treatment agent.

25. An aqueous solution containing the water-soluble polymer according to claim 1, wherein the aqueous solution has a total concentration of unreacted monomers of 15000 ppm or less.

26. The water-soluble polymer according to claim 1, wherein the content of the heavy metal ion is 0.1 to 10 ppm based on the total weight of a polymerization reaction solution upon completion of the polymerization reaction for producing the water-soluble polymer.

* * * * *

UNITED STATES PATENT AND TRADEMARK OFFICE
CERTIFICATE OF CORRECTION

PATENT NO.       : 8,106,149 B2
APPLICATION NO.  : 11/721768
DATED            : January 31, 2012
INVENTOR(S)      : Yoneda It is certified that error appears in the above-identified patent and that said Letters Patent is hereby corrected as shown below:

In the Claims:

At column 27, line 35, "claim 17" should read --claim 16--.

At column 28, line 15, "$R^3$ and le" should read --$R^3$ and $R^4$--.

Signed and Sealed this
Third Day of April, 2012

David J. Kappos
*Director of the United States Patent and Trademark Office*